United States Patent [19]

Stanley

[11] Patent Number: 4,655,514
[45] Date of Patent: Apr. 7, 1987

[54] SOUND REDUCTION FOR TRACKED VEHICLES

[75] Inventor: Edward T. Stanley, Centerline, Mich.

[73] Assignee: The United States of America as represented by the Secretary of the Army, Washington, D.C.

[21] Appl. No.: 841,085

[22] Filed: Mar. 7, 1986

[51] Int. Cl.$^4$ .............................................. B62D 55/20
[52] U.S. Cl. .................................. 305/56; 305/58 PC; 305/60
[58] Field of Search .................... 305/28, 34, 39, 56, 305/57, 60, 58 R, 58 PC

[56] References Cited

U.S. PATENT DOCUMENTS

| 2,917,095 | 12/1959 | Gulanot | 305/56 X |
| 3,954,308 | 5/1976 | Korner et al. | 305/56 X |
| 4,099,796 | 7/1978 | Groff | 305/46 |

FOREIGN PATENT DOCUMENTS 1222809  8/1966  Fed. Rep. of Germany ........ 305/56

Primary Examiner—David A. Scherbel
Attorney, Agent, or Firm—Peter A. Taucher; John E. McRae

[57] ABSTRACT

An add-on mechanism for high pitched sounds emitted by the tracks of military vehicles. Centerguide structures on the tracks are equipped with special U-shaped vibration dampers. Squeaks (high pitched sounds) associated with rubbing contact between the centerguides and the roadwheels are eliminated or minimized.

5 Claims, 4 Drawing Figures

SOUND REDUCTION FOR TRACKED VEHICLES

GOVERNMENT INTEREST

The invention described herein may be manufactured, used, and licensed by or for the Government for governmental purposes without payment to me of any royalty thereon.

BACKGROUND AND SUMMARY OF THE INVENTION

Military tanks used by the U.S. Army have ground tracks consisting of multiple track shoes pivotably linked together to form the track envelopes. Five or more roadwheels are carried at each side of the tank hull for rolling movements on upper faces of the track shoes.

Each roadwheel has a peripheral groove therein adapted to pass across upstanding centerguides carried by different ones of the track shoes. Commonly the roadwheel is formed out of two steel disks individually configured with divergent peripheral surfaces; when the disks are bolted together the divergent surfaces form a peripheral groove in the roadwheel.

The centerguides are located on the longitudinal centerline of the track to center the road wheels on the track surfaces, thereby preventing the roadwheels from running off the edge of the track. Side surfaces of the centerguides have rubbing contact with the groove surfaces on the road wheels. Substantial frictional forces are generated between the centerguides and the groove surfaces of the roadwheels. These forces cause the centerguides to vibrate.

It has been noted that under some conditions a high pitched sound is generated by the tracks. This sound is in the nature of a squeak or squeal. I believe this objectionable sound is attributable to vibrational motions of the centerguides, resulting from rubbing contact between the centerguides and the roadwheels.

My invention relates to a damper wall structure installable on each centerguide to reduce or eliminate vibrational movements that produce the objectionable squeaking sound.

Objects of the invention are to provide a damper wall structure that is:

1. capable of eliminating high pitched sounds that can cause damage or pain to the human ear drum, or that serve as a tank signature to enemy listening devices.
2. manufacturable at relatively low cost (in production quantities),
3. quickly (easily) installable on pre-existing centerguides, without modification of the centerguide structure, and
4. adapts to variations in centerguide contour (associated with normal metal forming tolerances and surface roughness tolerances).

THE DRAWINGS

THE DRAWINGS IN GREATER DETAIL

Figure 1:
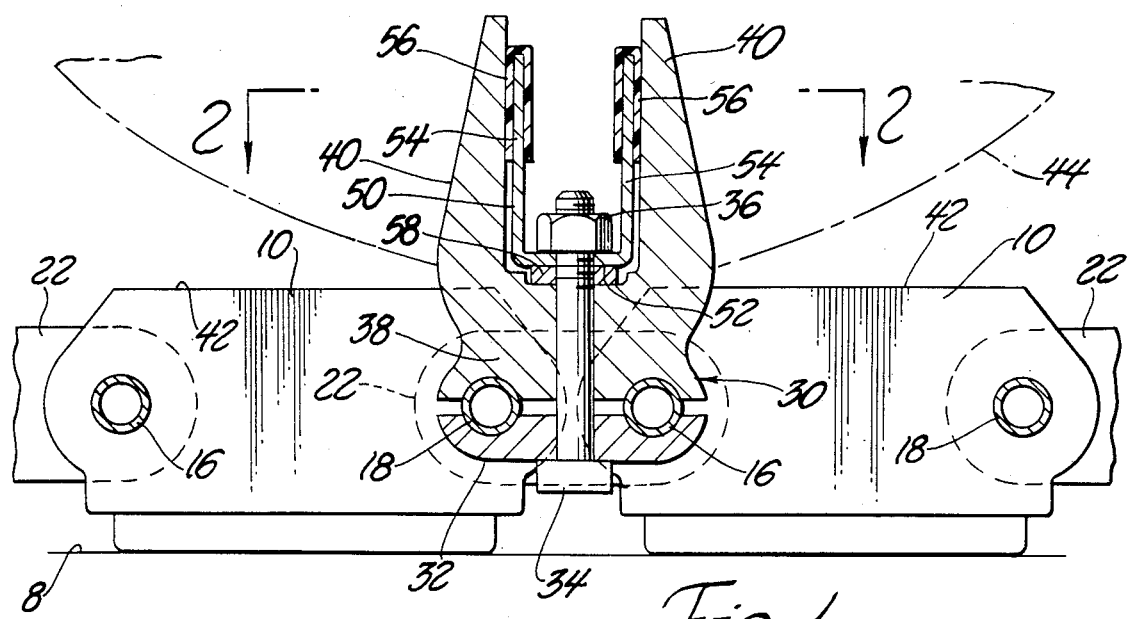
FIG. 1 is a fragmentary transverse sectional view tank through a tank track incorporating my invention.
Figure 2:
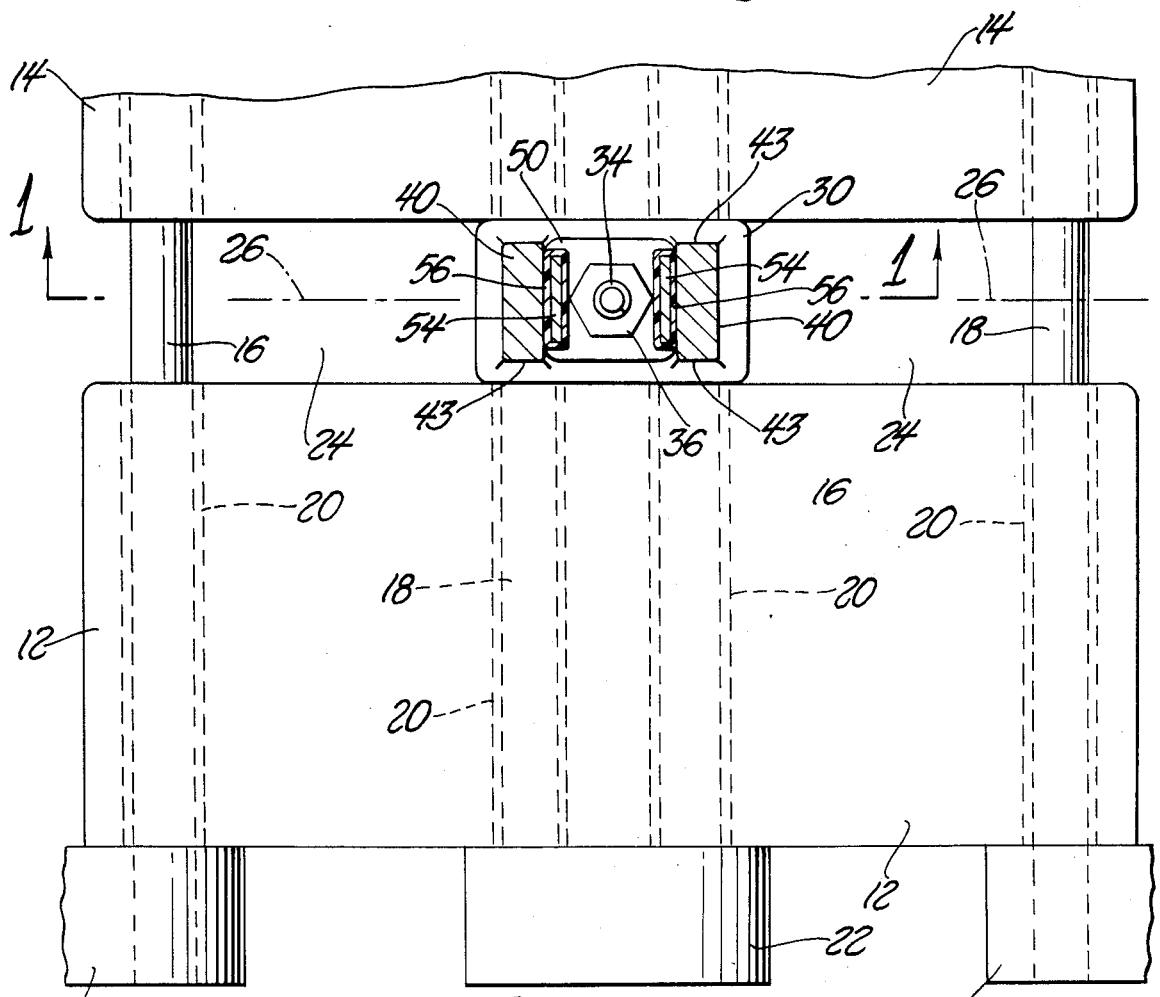
FIG. 2 is a sectional view on line 2—2 in FIG. 1.

FIGS. 1 and 2 fragmentarily show a track structure used on U.S. Army tanks. The track structure comprises a multiplicity (approximately eighty) of track shoes 10 arranged in series, one after another. FIG. 2 is a view taken from above a section of the track. FIG. 1 is a transverse sectional view taken through a central longitudinal plane parallel to the direction of track travel; FIG. 1 is taken along a horizontal sight line at ground level (indicated by numeral 8).

Each track shoe 10 comprises two laterally-spaced shoe bodies 12 and 14, and two transverse shafts 16 and 18 running through said bodies; an annular elastomeric sleeve 20 is bonded to the outer surface of each shaft and an oversize bore surface in the shoe body, such that a dirt-free pivot joint is formed between the shaft and shoe body. Ends of the shafts on adjacent track shoes are linked together by end connectors 22. The track shoes 10 can pivot relative to one another around the shaft axes.

As noted above, each track shoe body 10 comprises two laterally-spaced shoe bodies (or sections) 12 and 14. These shoe bodies are spaced apart to define an intervening space 24 straddling the track longitudinal centerline 26. A centerguide structure 28 is clamped to adjacent ones of shafts 16 and 18 in space 24. The drawings show one centerguide structure; in practice there is one centerguide structure at each track joint. In a track assembly containing eighty track shoes there would be eighty centerguide (one at each track joint).

Each centerguide structure comprises a main body 30 and an auxiliary clamping element 32. Aligned holes in body 30 and element 32 accommodate the shank portion of a clamping bolt 34. A nut 36 is torqued onto the threaded area of the bolt to retain the centerguide structure in a clamped condition on the associated shafts 16 and 18.

Main body 30 includes a web section 38 seated on shafts 16 and 18, and two upstanding prongs 40 spaced apart along track centerline 26. Prongs 40 are designed to enter into guidance grooves in non-illustrated roadwheels, as said wheels roll along the upper faces 42 of the track shoes. A fragmentary part of one roadwheel is illustrated by dashed line 44. The grooves in the roadwheels are essentially V-shaped, with width dimensions somewhat greater than the width dimensions of prongs 40.

Prongs 40 interact with the groove surfaces in the roadwheels to prevent the roadwheels from running off edge areas of the track shoes. In other words, prongs 40 center the roadwheels on the track, to thereby keep the track on the vehicle pathline defined by the roadwheels.

During operation, side edges 43 of prongs 40 rub against metal surfaces that define the roadwheel grooves. The rubbing action causes the prongs to vibrate so as to generate a high pitched squeaking sound. My invention is directed to an add-on wall structure 40 designed to dampen the vibrational movements of prongs 40, and thereby eliminate or reduce the squeaking sound.

Wall structure 40 takes the form of a U-shaped metal plate that includes a web wall 52 and two upstanding end walls 54. Web wall 52 has a circular hole therethrough accommodating bolt 34. Wall structure 50 is thereby held in place by the same nut 36 that is used to clamp centerguide body 30 on shafts 16 and 18.

The tip areas of end walls 54 are coated with a thick coating of an elastomeric material designated by numeral 56. Suitable elastomeric materials are Plastisol (tradename) and RTV silicone. Coating 56 forms an elastomeric spacer between wall 54 and the adjacent face of prong 40.

Walls 54 are oriented so that elastomeric coatings 56 have pressure contact with adjacent surfaces of the associated prongs 40. This may be accomplished by forming wall structure 50 so that walls 54 are slightly divergent in the as-formed state. Alternately web wall 52 may be formed so that its lower surface has a slightly rounded convex contour, such that flattening of wall 52 by the torque force on nut 36 cuases walls 54 to expand (deflect) into pressure engagement with the prong 40 surfaces.

A spacer 58 may be interposed between web wall 52 and the subjacent surface of web section 38 to minimize any tendency of wall 52 to become crushed or deformed into the recessed area of the centerguide body. The spacer adjusts (spaces) end walls 54 away from web section 38, whereby the end walls are freed for deflection toward the surfaces of prongs 40.

Wall structure 50 is designed to be a relatively rigid structure that offers substantial resistance to vibrational movements of prongs 40. When wall structure 50 was formed out of carbon steel (1010–1015) ASTM A576, the wall thickness was 0.12 inch.

Elastomeric coating 56 is believed to function in essentially the same fashion as a similar elastomeric sound absorbent material shown in U.S. Pat. No. 4,099,796 to E. R. Groff. The Groff patent shows two elastomeric pads or sheets 22 interposed between metal plate sections in a track pad to absorb vibrational (sound) energy. Groff indicates that the elastomeric pads should have a thickness in a range from about 0.01 to 0.12 inch. I envision a similar thickness range for coating 56.

As shown in the drawings, coatings 56 completely envelopes the tip area of each wall 54. However, it is essential that only the face of wall 54 presented to prong 40 have an elastomeric coating thereon. Thus coating 56 could be replaced by an elastomeric pad bonded to the outer face of wall 54.

It is desired that each elastomeric spacer 56 (pad or coating) have extensive facial contact with the adjacent surface of prong 40. Accordingly, each wall 54 is made to have an extensive width dimension (transverse to centerline 26). Also, the length of each elastomeric spacer is at least about one fifth (or more preferably one half) the length of the associated wall 54; the aim is to have substantial area contact between spacer 56 and prong 40.

Wall structure 56 is designed so that each wall 54 has a length slightly less than the length of prong 40. Also, the transverse width of each wall 54 is made to be somewhat less than the transverse width of Prong 40 to compensate for wear on prong side surfaces 43.

Figure 3:
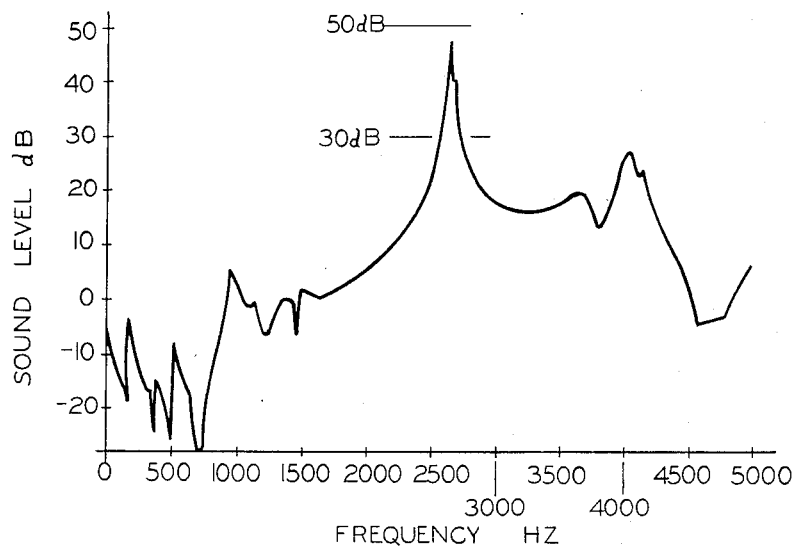
FIGS. 3 and 4 are graphs showing vibrational frequency versus audible sound level first for a track not having my invention, and second for a track having my invention.
Figure 4:
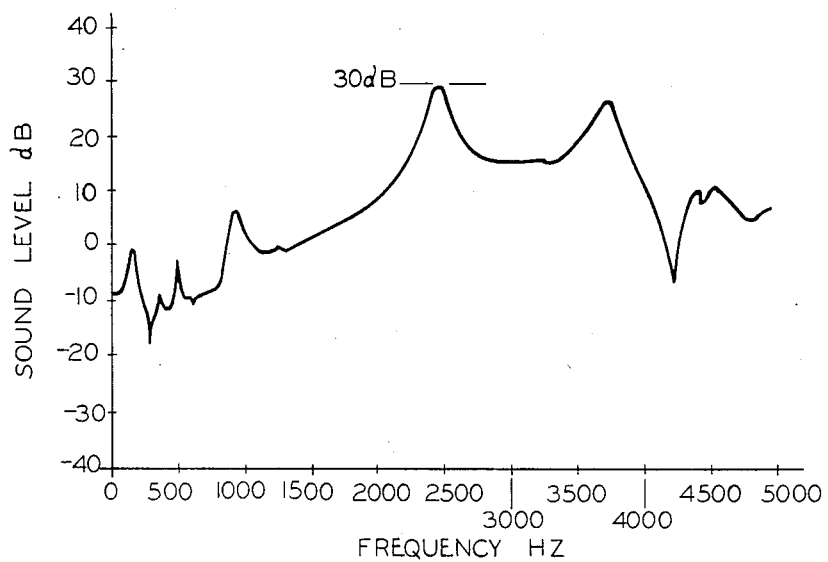

FIGS. 3 and 4 are charts illustrating the sound-absorbing capabilities of damper wall structures constructed as shown generally in FIGS. 1 and 2. Each chart is a graph plotting frequency against decible level. FIG. 3 was taken for a track operating without add-on wall structures 50. FIG. 4 was taken for the track after it had been equipped with the add-on wall structures 50.

The two charts are generally similar except that for frequencies at/near 2500 HZ the decibel level is about 20 dB less in the FIG. 4 graph (compared to FIG. 3). This frequency produces the undesired squeaking sound that my invention is designed to eliminate. I have found that with the reduction in decibel level the squeaking sound is in fact eliminated.

The described wall structure 50 is advantageous in that it is manufacturable at relatively low cost. Also, it is capable of quick installation on existing track without any modification of the track structure. Retrofit operations could be accomplished without removing the track from the tank on which it has already been installed.

I wish it to be understood that I do not desire to be limited to the exact details of construction shown and described for obvious modifications will occur to a person skilled in the art, without departing from the spirit and scope of the appended claims.

I claim:

1. In an endless terrain-engageable track comprising a multiplicity of track shoes linked together so that adjacent shoes can pivot relative to one another around axes transverse to the direction of track travel; and a centerguide body located on the centerline of the track at each track shoe; each centerguide body comprising a web section and two upstanding prongs spaced along the track centerline for entry into peripheral guidance grooves in roadwheels rolling on the track shoe upper faces: the improvement comprising a U-shaped wall structure carried within the space circumscribed by the prongs to dampen vibrational movements of said prongs; said damper wall structure including a web wall mounted to the web section of the centerguide body, and two upstanding end walls extending from the web wall along the facing surfaces of the aforementioned prongs; and an elastomeric spacer on the tip area of each upstanding end wall; each elastomeric spacer having extensive facial contact with the adjacent surface of the associated prong; the end walls of the damper wall structure being biased toward the facing surfaces of the prongs whereby the elastomeric spacers have pressure contact with the prong surfaces.

2. The improvement of claim 1: each elastomeric spacer being formed by an elastomeric coating around the associated end wall.

3. The improvement of claim 1 wherein the elastomeric spacer has a width approximately the same as the width of the web wall, and a length that is a significant percentage of the length of the associated end wall.

4. The improvement of claim 1 wherein each end wall terminates near the outer end of the associated prong, whereby the elastomeric spacer is located close to the prong outer end.

5. The improvement of claim 1 wherein the center guide body is clamped to the associated track shoes by means of a bolt extending through the aforementioned web section and a nut threaded on the bolt in the space above the web section; said web wall having a hole therethrough sized to accommodate the bolt, whereby the nut acts as a clamp element for both the center guide body and damper wall structure.

* * * * *